Sept. 7, 1937.  G. FLEISCHEL  2,092,447
TRANSMISSION CONTROL MECHANISM
Filed May 9, 1934   3 Sheets-Sheet 1
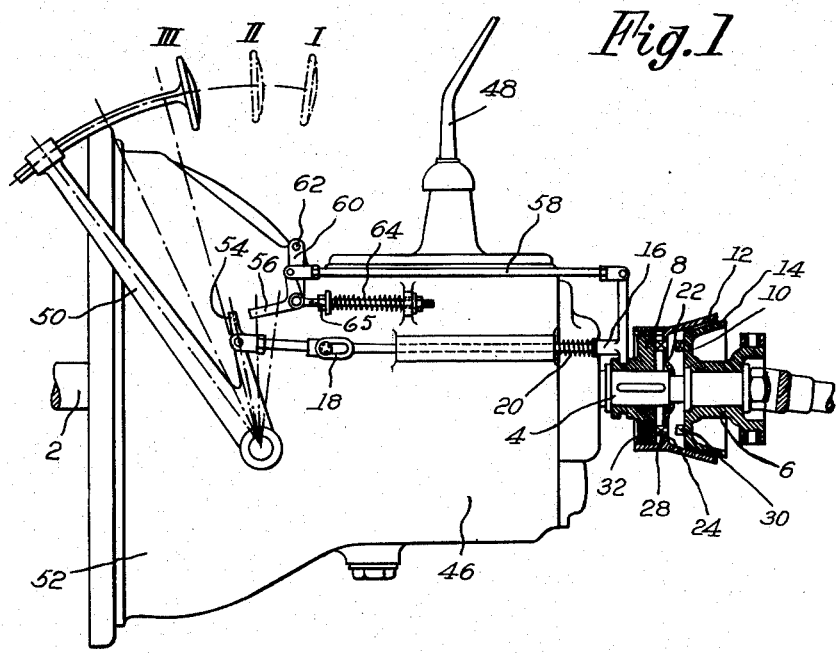
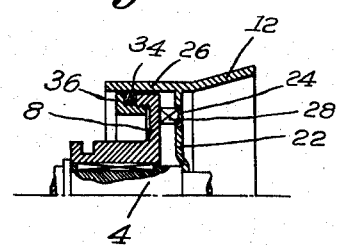
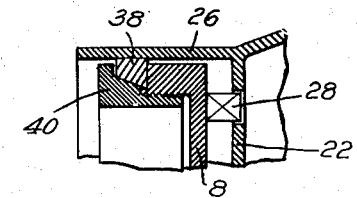
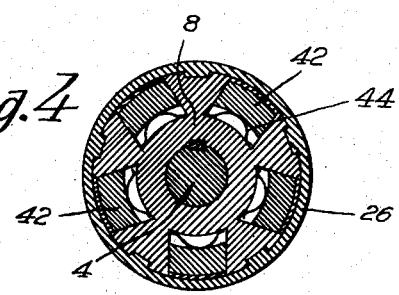
Inventor.
Gaston Fleischel

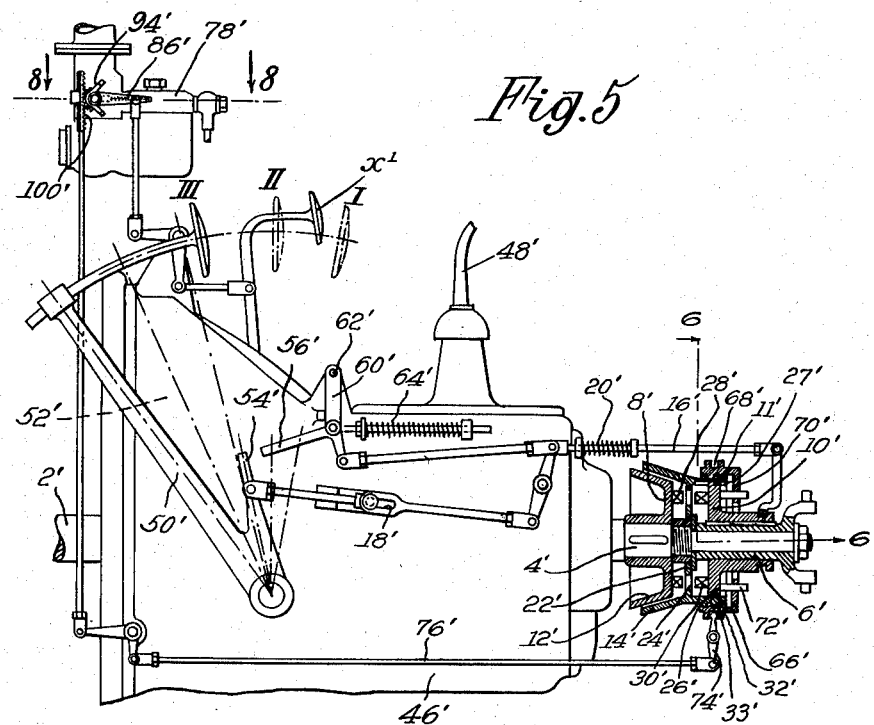
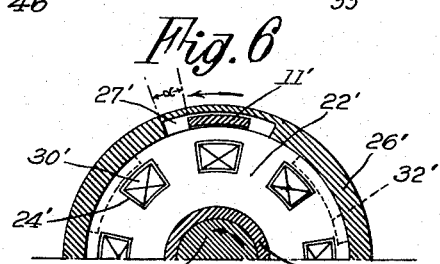
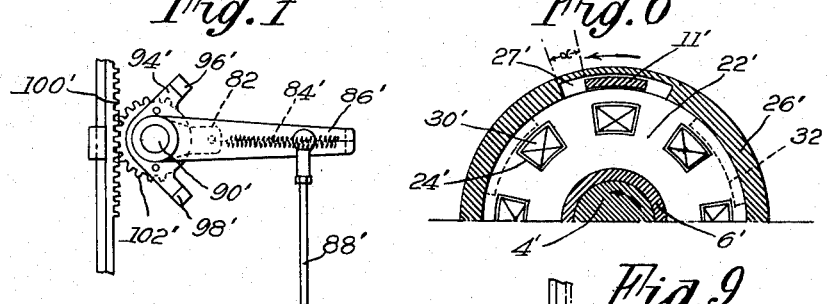
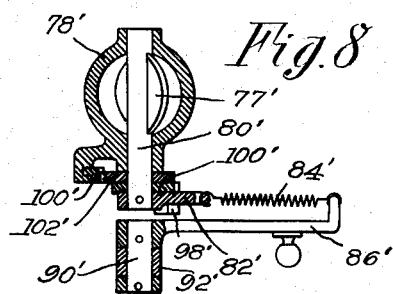
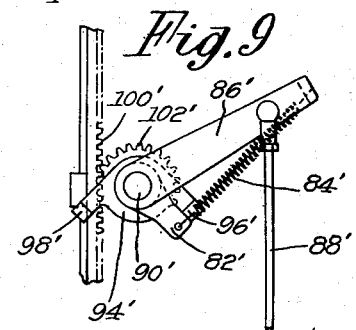

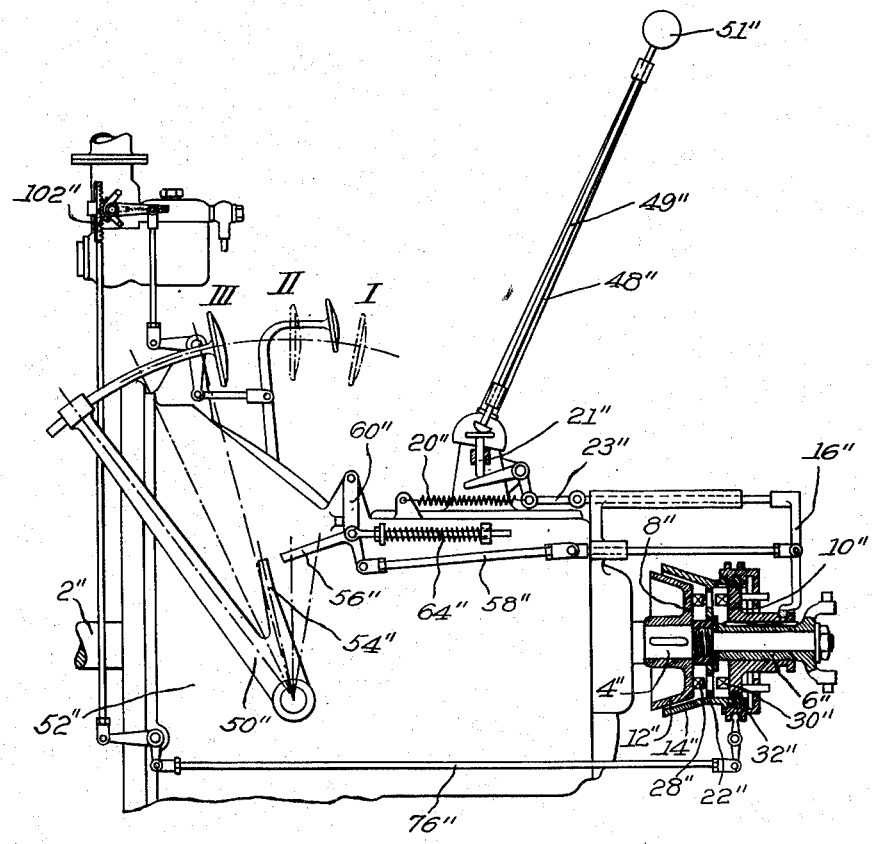

Patented Sept. 7, 1937

2,092,447

UNITED STATES PATENT OFFICE 2,092,447

TRANSMISSION CONTROL MECHANISM

Gaston Fleischel, Bleneau, France

Application May 9, 1934, Serial No. 724,668
In Belgium May 9, 1933

15 Claims. (Cl. 192—.01)

The present invention relates to transmission devices in which the gear ratio can be varied, but not in a progressive manner, and it concerns more especially transmission devices of this kind for automobile vehicles.

In most of the devices of this kind that are known at the present time several combinations of gear wheels are brought into play for connecting the driven shaft with the driving shaft, each combination corresponding to a different gear ratio, the passage from a combination of gear wheels to another combination being produced by the sudden engagement of mechanical parts, such as interlocking jaws or claws, or the teeth of sliding gears, with one another.

It is therefore necessary to momentarily interrupt the transmission of power through the gear box, for instance by disengaging a progressive friction clutch, which is generally interposed between the driving shaft and the gear box.

In spite of this precaution, the interlocking of the mechanical elements of the gear box still remains a delicate operation, and in order to facilitate this operation it has been endeavoured to produce devices, called "synchronizers", for bringing to the same rate of speed the elements that are to be mechanically coupled together.

The drawback of such an arrangement is first that it is often necessary to provide as many synchronizing devices as there are combinations of mechanical elements to be coupled together. Furthermore, the adjunction of these devices to gear boxes considerably increases the space occupied by these boxes and causes the shafts to work under unfavourable conditions. Finally, the synchronizing devices themselves, due to their being positioned in the gear box, cannot be given sufficient dimensions for ensuring a reliable working and a sufficient time of service.

On the other hand, it has been known for a long time that if a suitable coupling were interposed between the engine and the gear box, and another coupling between the gear box and the shaft to be driven, the combinations of gear wheels in the gear box could be changed very easily when both of the couplings above referred to were in the position corresponding to no mechanical power being transmitted through the gear box.

But if two progressive clutches, for instance two frictional clutches, are made use of, the whole mechanism is too complicated and too expensive to manufacture. If, on the other hand, use is made of couplings of a simple type, such for instance as claw clutches, then the difficulty above mentioned has merely been displaced since it is the engagement of the part of this clutch which becomes difficult and delicate.

Finally, gear boxes are known in which each combination of gear wheels is brought into play through the working of a clutch or a progressive brake. This is for instance the case of so-called "preselective" gear boxes in which the working of a first control element, most often a lever, allows the driver to choose in advance the clutch that corresponds to the combination of gear wheels that is to be employed, this clutch being brought into play only when the operation of a second control element, most often a pedal, is effected, this pedal controlling the whole of the clutches exactly in the same manner as the so-called clutch pedal of an ordinary transmission controls the clutch.

It may also be advantageous to apply to gear boxes of this type, in order to reduce the wear and tear of their clutches and brakes, devices for interrupting the transmission of power when changing from one gear to another, in such manner that power is again transmitted only after synchronizing the cooperating parts of the progressive coupling device.

The object of the present invention is to obviate the drawbacks above referred to and to provide a control device which works more smoothly and reliably, this device being very easy to operate.

As there are many coupling devices which can be utilized, it will be assumed, in the following description (and as a matter of fact this is the most general case) that the progressive coupling is a friction clutch, which will be sometimes called "first coupling", while the non-progressive coupling that is employed is some claw or jaw clutch, which will be sometimes called "second coupling."

These assumptions do not in any way reduce the scope of the present invention because it is quite obvious that the mechanisms that will be hereinafter described would not be modified if the relative positions of the progressive clutch and of the claw clutch were reversed with respect to the gear box.

On the other hand, from a theoretical point of view, the specific type of coupling that is employed does not matter because such a mechanism always includes a driving active element which is caused to turn rigidly with one of the two parts to be coupled together, another active driving element which is caused to turn rigidly with the other part, and finally a third control element which causes the active elements to be brought into or out of contact with each other, generally through an axial sliding displacement, this control element being eventually integral with one of the active elements.

Concerning now more particularly the gear boxes that include a plurality of progressive couplings, although their working is undeniably easier than that of ordinary boxes, especially concerning the efforts to be exerted and the rapidity of working, it still remains that the preselective element replaces the gear lever and that the second control element, although it controls a plurality of clutches, works exactly in the same manner as the single clutch pedal (first coupling) of an ordinary transmission. As the control elements play a part of primary importance in the working of the device according to the present invention, it is believed unnecessary to make a double description. I will therefore merely describe, by way of example, the case of a transmission including a single clutch and an ordinary gear box, this description applying also to boxes of any other kind.

Every time I will speak of utilizing a progressive coupling, placed either before or behind a gear box of any type whatever, it will be implied that the whole could be replaced by a gear box including progressive clutches for each of its combinations of gear wheels, or by a main progressive clutch coupled with a gear box some of the combinations of gear wheels of which are provided with a special progressive clutch.

In the following description I will call "synchronizer" a device which, interposed between two shafts turning with respective different speeds of revolution, is capable of exerting, when this is necessary, an action which tends to render these speeds equal. I deemed it necessary to give this definition chiefly in order to differentiate these synchronizers from free-wheels, as are often employed in transmissions, and which are sometimes called "synchronizers".

A free-wheel is a mechanism which is capable of coupling two shafts together when their respective speeds of revolution are or become equal, but this mechanism is wholly unable of rendering these speeds equal. Furthermore, the action of a free-wheel is, so to speak, unilateral, which means that the coupling is effected only when one of the two shafts, which has a speed of revolution smaller than that of the other shaft, is given a speed equal to that of the second shaft, but it prevents the first mentioned shaft to turn at a speed higher than that of the second shaft.

On the contrary, a synchronizer, according to the present invention, works whatever be the relative speed of revolution of the first shaft with respect to the second shaft and it tends, in all cases, to equalize the speeds of these two shafts.

The essential feature of the present invention consists in providing mechanisms of the type above referred to for transmitting power from a driving shaft to a driven shaft with at least one progressive coupling and one non-progressive coupling through which the power must be transmitted, whatever be the combination of gear wheels that is employed, and in combining a synchronizing device with the non-progressive coupling.

Another feature of the present invention consists in so arranging the synchronizing device that its action is variable, for instance in accordance with the speed of revolution of the parts to be coupled together through said device.

Another feature consists in providing, between the active elements of the synchronizing device, elements which, under the influence of the relative displacement of these elements, prevent the mechanical connection to be established as long as these active elements are not rotating with the same speed.

Still another feature consists in utilizing the relative displacements of the active elements of the synchronizer, during the period of synchronization, for acting on the element, for instance the throttle valve of the carburetter, which controls the speed of revolution of the driving part in such manner as to modify this speed until it becomes substantially equal to that of part to be driven.

Still another feature consists in arranging the intake elements of the engine in such manner that they can be controlled through elastic means, the means, actuated by the synchronizer for modifying temporarily the speed of the engine acting directly on these intake elements, say for instance the throttle, so as to modify its position in the direction that facilitates the synchronizing action, independently of the position given at that time to the throttle by the usual control element operated by the driver.

Another feature consists in providing the progressive coupling with means for preventing its active part to come into operative engagement as long as the non-progressive coupling is not itself let in.

Still another feature consists in connecting the control elements of the progressive and non-progressive couplings in such manner that the non-progressive coupling ceases to act as soon as the progressive coupling is sufficiently disengaged and is brought into operative position before the progressive coupling is let in to any material degree.

Finally, still another feature of the present invention consists in operatively connecting the control element of the non-progressive coupling with the control element of the transmission (gear lever), this control element being therefore independent of that which acts on the progressive coupling.

Other features of the present invention will result from the following detailed description of some embodiments thereof.

Preferred embodiments of the present invention will be hereinafter described with reference to the accompanying drawings, given merely by way of example, and in which:

Fig. 1 is a side elevational view of a transmission according to a first embodiment of the present invention;

Fig. 2 is a detailed section view of one of the elements illustrated in Fig. 1.

Fig. 3 is a similar view of a modified form of the element shown in Fig. 2.

Fig. 4 is a similar view of a further modification of the same.

Fig. 5 is a view, similar to Fig. 1, showing another embodiment of the invention;

Fig. 6 is a sectional view on a larger scale, on the line 6—6 of Fig. 5;

Fig. 7 shows, on an enlarged scale, in elevation, another part of the transmission.

Fig. 8 is a cross section on the line 8—8 of Fig. 5.

Fig. 9 is a diagrammatical elevational view of the elements shown in Figs. 7 and 8, but in another position;

Finally, Fig. 10 is a view similar to Figs. 1 and 5, showing a transmission made according to a third embodiment of the present invention.

The gear box which is a part of the transmission may be of any suitable type, being either an ordinary gear box or a so-called "preselective" gear box. It has therefore been deemed unnecessary to show any detail of the inside of this box. It has been assumed that this box is controlled by the driver through a hand lever 48 but it should be well understood that this control could take place in any other suitable manner, manual or otherwise. By way of example, 2 is the driving shaft, 52 is the casing of the main clutch or "first coupling" provided between the driving shaft 2 and the gear box, it being well understood that this first coupling may consist either of a single progressive clutch, for instance of the friction type, or of the plurality of progressive clutches of preselective gear boxes, and is controlled, in both cases, by a pedal 50.

4 is the shaft on the output end of the gear box. Between this shaft 4 and the universal joint through which the wheels of the vehicle are driven and the input element of which is supposed to be hollow shaft 6, which is free to rotate on a prolonged part of shaft 4, I provide a second coupling, which, in the example shown consists of a claw clutch.

To this effect, I provide, on the adjacent ends of shafts 4 and 6, two plates 8 and 10, the opposite faces of which are provided with respective claws, dogs, teeth, etc., 28 and 30, which may be engaged together for establishing a connection between shafts 4 and 6.

On the periphery of plate 10, which is integral with shaft 6, there is provided a conical part 14. Plate 8 is adapted to slide axially along shaft 4 under the action of a control element 16. On this plate 8 there is provided a conical part 12, which can slide axially, but not angularly, with respect to said plate. The axial displacements of this part 12 are limited, in one direction, by the presence of cone 14, and in the other direction by a transverse plate 22 which is arranged to abut against a shoulder of shaft 4. Apertures 24 are provided in this plate 22 for the passage of claws 28 carried by plate 8.

The relative axial displacement between plate 8 and sleeve 26, which supports cone 12 is limited by friction elements which act, in a uniform and eventually adjustable manner. These elements may for instance consist, as shown in Fig. 1, of parts 32, of metal or a plastic material having a high coefficient of friction, which are engaged in peripheral recesses of plate 8. In the modification of Fig. 2, these elements consist of a plastic member 34 tightly held between a flange of plate 8 and a threaded ring 36. In the embodiment of Fig. 3, the friction element consists of a metallic ring 38 analogous to the packing rings utilized in internal combustion engines for ensuring fluid-tightness between the piston and the cylinder, this ring being given a conical face on the inner side, which conical face rests on a correspondingly conical face of an adjusting ring 40. Springs may also be provided in connection with these friction elements in order to increase their efficiency.

The friction elements may also be given an action variable with the speed or the inertia of the parts that drive plate 8, as shown in Fig. 4, in which they consist of masses 42, which may also be urged outwardly by springs 44 and which are applied against sleeve 26 under the action of centrifugal force.

The control element 16 is connected, for instance through a sliding connection 18, with the pedal 50 of the main clutch 52, so that the two couplings are interconnected. Owing to the presence of this sliding connection 18, the second coupling 28, 30 is disengaged only when the first coupling 52 has been sufficiently disengaged, and the parts of this second coupling are brought back into operative engagement before the parts of the first coupling are applied against one another with any material strength. This is due to the fact that if pedal 50 is depressed from its position I, in which power is transmitted with a given gear ratio, into position II, the main clutch 52 is nearly wholly disengaged, but no action has been exerted on the second coupling 28, 30, owing to the presence of the sliding connection 18. From position II to position III, the pedal completes the disengagement of clutch 52, and causes, through control element 16, plate 8 to slide until claws 28 are disengaged from claws 30. Simultaneously, cone 12 is moved away from cone 14 through the action of elements 32 (or the equivalent) which establish a frictional connection between plate 8 and cone 26—12.

If pedal 50 is allowed to come back from position III to position II, control element 16 is released and its spring 20 produces the engagement of the parts 28, 30 of the second coupling together, as will be hereinafter explained. The position of the pedal is so chosen that, at this time the cooperating parts of clutch 52 are slightly in contact so as to drive the elements of the gear box, but in a sufficiently loose manner for permitting the engagement of the parts of the second coupling 28, 30 to take place without difficulty. Between positions II and I, the pedal permits of bringing the cooperating parts of the first coupling 52 into operative engagement.

The engagement of the cooperating parts of the second coupling is facilitated by the action of the synchronizer combined with this coupling, the elements of which have been above described. As this second coupling has been so devised that the power to be transmitted must necessarily pass through it, whatever be the combination of gear wheels that is employed (for instance, in the embodiment illustrated by Fig. 1, this coupling is placed behind said box) the synchronizer that is combined with it can be the only one provided in the transmission. This is due to the fact that, as above explained, the combinations of gear wheels can be easily changed when the gear box is unconnected both with the engine and with the rear part of the transmission. The only difficulty when passing from one gear to another lies in the engagement of the parts of the second coupling with one another, but, owing to the provision of the synchronizer, this difficulty is overcome, in the device according to the present invention.

When plate 8 is in its extreme position away from plate 10 (pedal 50 being in position III), shafts 4 and 6 are unconnected. If the pedal is allowed to come back into position II, plate 8 and cone 12 are moved toward plate 6 and cone 14, through the action of spring 20 until cones 12 and 14 are in contact with each other. At this time claws 28 and 30 are not in engagement, but the contact between the cones produces, through the resulting friction, the synchronization of shafts 4 and 6. It should be noted that the importance of the friction of elements 32 plays, with respect to cones 12 and 14 the same part as the springs in an ordinary clutch, or the spring ball in usual synchronizers.

The efficiency of the single synchronizer depends merely upon the size of cones 12 14 and upon the friction stresses, either uniform or variable, existing between friction elements 32 and sleeve 26. As the synchronizer is provided on the outside of the gear box, there is nothing to limit these elements, which can therefore be given any desirable value.

It may be advantageous to prevent the main clutch 52 from being fully let in as long as the non-progressive coupling 28, 30 has not been brought back into its operative driving position. This result can be obtained by providing pedal 50 with a stop 54 adapted to correspond with a locking member 56, which can be removed from in front of the stop 54 if the parts of coupling 28, 30 are in engagement with one another, and is on the contrary, positioned across the path of said stop if this coupling 28, 30 is disengaged. This locking member 56 consists, for instance, as shown in Fig. 1, of a bell crank lever one arm of which can be brought across the path of stop 54 and the other arm of which is jointed to a rod 58, itself jointed to the control element 16.

Care must be taken to leave a certain play between locking member 56 and stop 54, when the pedal is in its position corresponding to the maximum disengagement of the clutch. In this way a slight drive is insured, for reasons above stated, this being sufficient to keep the input shaft of the gear box revolving at a speed substantially equal to that of the engine, but not being capable of interfering with the engagement of the coacting parts of the second coupling 28, 30 with one another.

If it is desired to adjust this slight driving action in a very accurate manner, locking member 56 is mounted on a support 60 pivoted to a fixed point 62 and a spring 64, of suitable and adjustable strength, is caused to act on said support, this spring elastically maintaining the locking member when it is acted on by stop 54. By adjusting the tension of this spring 64 by means of a nut 65, it is possible to obtain the driving action desired and which is the most favorable under the conditions of operation.

The spring 64 must be stronger than the spring 20 and the springs of the clutch 52 in combination. Otherwise, the pressure of these springs would force the pedal 50 upwardly in spite of the presence of the locking member 56. The spring 64 therefore acts to vary the position in which the pedal 50 will be stopped by the locking member 56, so that the degree of engagement of the clutch when the locking member 56 is in operative position may be varied. With such an arrangement, there can be no difficulty in the operation of the transmission. The driver fully depresses pedal 50, which successively disengages the two couplings. The gear lever 48 (or the corresponding element in the case of any other type of control) can then be operated without taking any special precaution. Immediately after this, the driver releases pedal 50, which moves upwardly through a small angle until stop 54 comes into contact with locking member 56. The synchronization operation, which starts as soon as the driver releases the pedal, then follows, and as soon as it is completed the locking member 56 is moved out of the path of stop 54, thus permitting both couplings to be let in immediately.

It is believed that the operation of the device should be obvious from the foregoing description. Assuming that the vehicle is moving in gear, and the driver wishes to change to another gear, the clutch pedal 50 is fully depressed. As the pedal reaches the position III, the clutch 52 is completely disengaged. Through connection 18, the member 8 is shifted to the left and the teeth 28 and 30 of the positive coupling are disengaged. The transmission 46 will now be disconnected both from the engine and from the wheels. The gears may then be shifted in any manner without difficulty.

After the shifting of the gears is completed, the operator releases the clutch pedal 50. The pedal now rises to position II in which the clutch 52 is slidably engaged, so as to impart some movement to the transmission. The pedal is held in position II by the locking member 56, this locking member being held in operative position because of the fact that the teeth 28, 30 of the positive coupling have not engaged and the disc 8 through link 58 holds the locking member 56 in the position shown.

The pin and slot connection 18 permits the spring 20 to press the plate 8 to the right. As this is done, the friction members 12, 14 engage, thus tending to bring the speeds of plates 8 and 10 into synchronism. As soon as the speeds are synchronized, teeth 28, 30 can engage and the plates 8, 10 move into coupled relation. This final movement through link 58 turns locking member 56 out of the path of stop 54, and the pedal 50 can rise to position I. The clutches 52 and 28, 30 are now fully engaged and the vehicle is driven through the gears selected.

Figs. 5 to 9 inclusive disclose another embodiment of the transmission device according to the present invention, in which plate 8' is keyed on the shaft 4' while plate 10' is slidable axially on the driven shaft 6'. The working of the synchronizing device is the same as above described, with this difference that the transverse plate 22' of sleeve 26' can be interposed between the free ends of claws 28' and 30' when said claws are not in engagement with one another. In this case also this plate 22' is provided with apertures 24' for the passage of claws 30' when both shafts 4' and 6' turn in synchronism.

In this embodiment, sleeve 26', which carries cone 14' can, not only slide axially with respect to plate 10', this displacement being braked by friction elements 32, but also move angularly with respect to said plate, with a certain maximum amplitude (Fig. 6) from a mean position, and either in one direction or in the opposite one, according to the direction of the relative speed. The angular amplitude above mentioned is smaller than the angular interval between two successive claws 30' of plate 10'.

Claws 30' are given a length such, or plate 10' and cones 12', 14' are given relative positions such, that cone 14' is in contact with cone 12' before the free ends of claws 30' reach transverse plate 22'. If shafts 4' and 6', and therefore plates 8' and 10' do not rotate with the same speed of revolution, cone 14', owing to its frictional engagement with cone 12' moves angularly with respect to plate 10', either in the direction of the arrow as the speed of shaft 4' is higher than that of shaft 6' or in the opposite direction when it is lower. The relative angular displacement of cone 14' with respect to plate 10' is stopped as soon as a projection 11' carried by plate 10' comes into contact with the corresponding edge of a notch 27' provided in sleeve 26'. But, due to this angular displacement, apertures 24' are no longer located opposite the claws 30' of plate 10' and the latter cannot move forward for the coupling of the parts together, whatever be the direction of the relative displacement of plates 8' and 10'. It should be noted that the control element 16', which is consequently stopped, still acts under the effect of spring 20' so as to strongly apply cones 12' and 14' against each other, which increases the frictional stresses between these cones and promotes synchronization.

When synchronization has been obtained, the relative speed is reversed and as cone 14' is still driven by cone 12', it moves angularly with respect to plate 10', driving transverse plate 22' together with it. When the whole of 4'—12'—22' has moved through an angle α with respect to plate 10', that is to say has come back to its mean position, claws 30' are located opposite apertures 24' of plate 22'. They can therefore pass through these apertures, under the action of spring 20', and come into engagement with the claws 28' of plate 8' which is then turning at substantially the same speed.

It results from the preceding explanations that the coupling of shafts 4' and 6' together can take place only when the speeds of shafts 4' and 6' are synchronized and that any effort exerted on the control element 16' facilitates this synchronization.

In order to reduce to a minimum the time necessary for synchronization, I may utilize the relative angular displacement of cone 14' with respect to plate 10' for acting on the mechanism that controls the speed of revolution of the driving shaft 4' in such manner as to modify this speed until it becomes substantially equal to that of the shaft 6' to be driven.

I may advantageously act on the throttle valve of the carburetter of the internal combustion engine by which the transmission is driven for facilitating synchronization.

For this purpose, the device is so adjusted that when pedal 50' is in position II the main clutch 52' is not wholly disengaged, so that plate 8' is always driven. I provide, on the outer face of sleeve 26' a thread 33' of large pitch and I screw on this thread a kind of nut 66' carried by a part 70' which turns together with plate 10', but which can also move axially with respect to said plate owing to the presence of guiding rods carried by plate 10' and engaging in corresponding holes provided in said part 70'.

With such an arrangement, due to the frictional stresses developed between cones 12' and 14', nut 66' occupies one of its extreme positions when the speed of revolution of plate 10' is higher than that of plate 8' and projection 11' is in contact with the corresponding end of notch 27'. On the contrary, nut 66' is in its opposite extreme position when the speed of revolution of plate 10' is lower than that of plate 8'. Finally, when apertures 24' are located opposite claws 30', nut 66' is in its mean position.

The displacements of nut 66' are transmitted through a lever 74' which is engaged in a peripheral groove 68' of nut 66', and through a system 76' of links and rods, to the means above referred to for acting on the engine, these means consisting generally of the throttle valve of the carburetter. The connection is so devised that, whatever be the position that the carburetter is occupying at this time and independently of the usual control device actuated by the pedal, said throttle is opened when the nut is in one of its extreme positions, is closed when said nut is in the other extreme position, and is not acted upon when said nut 66' is in its mean intermediate position.

The system of links and levers is so devised that the throttle is closed when plate 10' carried by driven shaft 6' is turning with a speed of revolution lower than that of plate 8'. It follows that the engine is slowed down, thus reducing the speed of revolution of plate 8', which, as above explained is still connected with the driving shaft through main clutch 52' the cooperating parts of which are slightly applied against one another. The speed of plate 8' connected to the engine therefore takes a value equal to that of plate 10', and when synchronization is obtained, the claws 30' can penetrate into apertures 24' and engage with the claws 28' of plate 8'. At this time, nut 66' has come back into its mean intermediate position, in which it exerts no action whatever on the throttle.

If, on the contrary, the speed of revolution of plate 10 is higher than that of plate 8', the nut 66' moves in the opposite direction and opens the throttle, which increases the speed of revolution of the engine. When synchronization is obtained, claws 28' and 30' can engage with one another.

It should be well understood that if the device failed to work, for some reason, that is to say if the respective claws failed to engage one another when they are opposite one another, the engine would be automatically brought back to conditions of synchronization until the claws are brought into engagement. For instance, if it is supposed that, at the beginning, the speed of 30 revolution of plate 8' is lower than that of plate 10', nut 66' causes the throttle to be opened and the speeds of revolution of plates 8' and 10' tend to become equal. If now, when these speeds have become equal, the claws fail to engage with one another, the speed of plate 8' tends to become higher than that of plate 10'. Immediately projection 11' will come into contact with the opposite end of notch 27'. This causes nut 66' to occupy its opposite extreme position, thus closing the throttle of the carburetter and the speed of plate 8' is then reduced until it becomes equal to that of plate 10'. Then the engagement of claws 28' and 30', which had failed to take place a first time, can take place for good.

In Figs. 5 to 9 I have shown an embodiment of the means for transmitting to the throttle 77' of carburetter 78' the movement of nut 66' operatively connected with the synchronizer.

The spindle 80' of the throttle carries a finger 82' keyed thereon and connected through a spring 84' with the lever 86' on which the driver acts through pedal 88'. The spindle 90' of this lever may, for instance be mounted on an independent support 92'. This arrangement, which is shown by the drawings, is advantageous because it eliminates the frictional stresses, often very important, that are produced by the action of pedal 88', which frictional stresses would oppose the movement of the throttle.

It will be readily understood that, under these conditions, any angular displacement imparted by the driver to lever 86' is transmitted through spring 84' to throttle 77'.

On the spindle 80' of the throttle, there is mounted loose a double stop consisting for instance of a V-shaped piece 94' on which finger 82' can abut. The angle of the V is sufficient for permitting the finger 82' to turn through the usual angle.

This piece 94' is connected, through the system 76' of links and levers, with the nut 66' provided on the synchronizer so that said piece 94' can rotate as much as it is necessary in one direction or in the other. It will be readily understood that if the end 86' of lever 84' moves in a downward direction (Fig. 9), it pushes along the finger 82' of the throttle into its extreme lower position, which corresponds to the minimum opening of the throttle. If, on the contrary, the end 88' of lever 84' is moved upwardly it brings, through finger 82', the throttle into its position of maximum opening. In both cases, the position of the control lever 86' shall not have been modified and shall not have interfered with the working of the device, owing to the elongation of the spring 84'.

As the amplitude of the movement of piece 84' can be considerable, it may be advantageous to cause the system 76' of links and levers to act thereon through a rack 100' meshing with a toothed wheel 102' rigid with piece 84'.

Elements 2'; 18'; 54'; 56'; 58'; 60'; 82'; 64' and 72' correspond in general to the similarly numbered elements in Figs. 1 to 4.

In Fig. 10 I have shown an arrangement similar to that illustrated by Figs. 5 to 9 but in which the control element 16 of plate 8 is no longer connected with the pedal 50 of the main clutch 52, but is connected to the gear lever 48. With such an arrangement, I eliminate the drawback, common to both of the embodiments of Figs. 1 and 5, that, each time pedal 50 is actuated, the second coupling 28, 30 is disengaged, even if the combination of gear wheels of the gear box that is working is not to be changed.

On the contrary, with the arrangement disclosed by Fig. 10, the second coupling 28, 30 is not disengaged unless the combination of gear wheels of the gear box is changed by means of the gear lever 48.

For this purpose, I add to the ordinary gear lever 48 a rod 49, parallel thereto, and slightly bent laterally, if this is necessary. This rod is intended to control the second coupling. It is slidable parallelly to the gear lever and is provided, at its upper end with the usual operating handle or ball 51 of the gear lever. The lower end of rod 49 is capable of actuating a push piece 21 to which the axial displacement of rod 49 is transmitted without being moved to any substantial degree by the oscillation of the gear lever. The displacements of push piece 21 are transmitted, through a system of articulated links and levers 23, provided with a return spring 20, with the control element 16 acting on the second coupling. To this element 16 I connect, as in the embodiments of Figs. 1 and 5, the control device 58 of a locking member 56 provided with its elastic stop 64 so as to prevent the clutch pedal 50 from coming back to its position I as long as the second coupling 28, 30 has not been brought back into the position in which its coacting parts are engaged with one another. Furthermore, in the embodiment of Fig. 10, I have kept the automatic device 76—102 for controlling the throttle of the carburetter and accelerate the operations.

This device works in the following manner: In order to pass from a combination of gear wheels in the gear box to another combination, the driver first disengages the clutch 52 by depressing pedal 50. Then he pushes the handle 51 of the gear lever in a downward direction, which disengages the second coupling 28, 30. He can then move without any difficulty the gear lever 48 since both couplings are disengaged. After having brought this lever into the desired position he can release both the gear lever 48 and the clutch pedal 50. The operating handle 51 can return to its normal or inactive position only when synchronization has been obtained, and locking member 56 prevents pedal 50 from moving upwardly, and therefore the first coupling from being let in, as long as synchronization has not been obtained.

As soon as synchronization is obtained, the vehicle is again driven by the engine, without any risk because disk 22 allows claws 30 to pass through orifices 24, so that the cooperating parts of the second coupling come into engagement under the action of spring 26. This engagement causes locking member 56 to be moved off from the path of member 54, and the progressive clutch 52 can in turn be let in, under the action of its own springs.

2'''; 4'''; 6'''; 16'''; 12'''; 14'''; 32''' and 68''' correspond in general to the elements bearing similar numbers in Figs. 1 to 4.

While I have, in the above description, disclosed what I deem to be efficient embodiments of the present invention, it should be well understood that I do not wish to be limited thereto as there might be changes made in the arrangement, disposition, and form of the parts without departing from the principle of the present invention as comprehended within the scope of the appended claims.

In these claims the word "clutch" is employed in its general meaning, to wit a coupling for connecting two working parts, for instance shafts, permitting either of these parts to be thrown into or out of gear with the other, this definition including both progressive clutches, such as friction clutches, and non-progressive, or positive, clutches, such as claw clutches.

What I claim is:

1. A transmission of the type described, which comprises in combination, a driving member, a driven member, a gear box, a progressive clutch for coupling one end of said gear box with one of said members, a positive clutch for coupling the other end of said gear box with the other member, and synchronizing means including two friction clutch elements adapted to cooperate with each other carried by two cooperating parts of said positive clutch respectively, one of said friction clutch elements being slidable, with respect to the part of the positive clutch that carries it, toward, and away from, the other friction clutch element, means for limiting the axial displacement of said slidable friction clutch element away from the other friction clutch element, and means for producing a continuous sliding friction resisting the axial displacements of said slidable friction clutch element with respect to the part of the positive clutch that carries it.

2. A device according to claim 1, which further comprises radially movable masses angularly connected with the part of the positive clutch that carries said slidable friction clutch element and adapted to act on said frictional braking means for varying the action thereof in accordance with the speed of revolution of said last mentioned part of the positive clutch.

3. A transmission of the type described, which comprises in combination, a driving member, a driven member, a gear box, a progressive clutch for coupling one end of said gear box with one of said members, a positive clutch for coupling the other end of said gear box with the other member, synchronizing means, associated with said positive clutch, for causing the speeds of revolution of the cooperating parts of said positive clutch to tend toward the same value, said last means including a slidable member, means for producing a sliding friction resisting movement of said slidable member, and means operative by said synchronizing means for preventing the cooperating parts of the positive clutch from engaging with one another as long as said parts do not rotate with the same speed of revolution.

4. A transmission of the type described, which comprises in combination, a driving member, a driven member, a gear box, a progressive clutch for coupling one end of said gear box with one of said members, a positive clutch for coupling the other end of said gear box with the other member, and synchronizing means including two friction clutch elements adapted to cooperate with each other carried by two cooperating parts of said positive clutch respectively, one of said friction clutch elements being rigidly fixed to the respective part of the positive clutch that carries it, the other friction clutch element being slidable both axially and angularly, within certain limits, with respect to the respective part of the positive clutch that carries it, means for producing a sliding friction resisting the displacements of said slidable friction clutch element with respect to the part of the positive clutch that carries it, and means, rigidly fixed to the said slidable friction clutch element for preventing the cooperating parts of the positive clutch from engaging with one another as long as said parts of the positive clutch do not rotate with the same speed of revolution.

5. A transmission of the type described, which comprises in combination, a driving member, a driven member, a gear box, a progressive clutch for coupling one end of said gear box with one of said members, a positive clutch for coupling the other end of said gear box with the other member, the last mentioned clutch including at least two plates movable axially with respect to each other, and cooperating claws carried by said plates respectively, and synchronizing means including two friction clutch elements adapted to cooperate with each other carried by said two plates respectively, one of said friction clutch elements being rigidly fixed to the respective plate that carries it, the other friction clutch element being slidable both axially and angularly, within certain limits, with respect to the respective plate that carries it, means for frictionally braking the displacements of said slidable friction clutch element with respect to the plate that carries it, and a disk rigidly fixed to said slidable friction clutch element and provided with apertures for the passage of the claws of the corresponding plate, so as to prevent the last mentioned claws from being moved axially into engagement with the claws of the other plate as long as said plates do not rotate with the same speed of revolution.

6. A transmission according to claim 5 including means for limiting the angular displacement of said slidable friction clutch element to a given angle in both directions from a mean intermediate position which corresponds to said apertures being in line with said claws, and means for urging said slidable friction clutch element toward said mean intermediate position.

7. In a device including a source of power, control means for varying the power supplied by said source, a driving member actuated by said source, and a driven member, a transmission device of the type described, which comprises in combination, a gear box, a progressive clutch for coupling one end of said gear box with one of said members, a positive clutch for coupling the other end of said box with the other member, synchronizing means, associated with said positive clutch, for causing the speeds of the cooperating parts thereof to tend toward the same value, and means operative by said synchronizing means for acting on said control means in such manner as to further tend to render equal the speeds of revolution of said cooperating parts of the positive clutch.

8. In a device including an internal combustion engine, a throttle for varying the power supplied by said engine, a driving shaft actuated by said engine, and a driven shaft, a transmission device of the type described, which comprises in combination, a gear box, a progressive clutch for coupling one end of said gear box with one of said shafts, a positive clutch for coupling the other end of said gear box with the other shaft, synchronizing means, associated with said positive clutch, for causing the respective speeds of revolution of the cooperating parts of said positive clutch to tend toward the same value, and means operative by said synchronizing means for acting on said throttle in the direction that tends to further equalize the speeds of revolution of said cooperating parts of the positive clutch.

9. A transmission device according to claim 8 in which the throttle is elastically connected to the control element thereof, further characterized in that the last mentioned means include a plurality of articulated parts operatively connecting said synchronizing means with said throttle.

10. In a system including an internal combustion engine, a throttle for varying the power supplied by said engine, an element for controlling said throttle, a deformable spring interposed between said element and said throttle, a spindle pivotally supporting said throttle, a driving shaft and a driven shaft, a transmission according to claim 8, which further includes, a finger rigidly fixed to said spindle, a pivoting V-shaped member adapted to cooperate with said finger, and means for pivoting said V-shaped member, the last mentioned means of claim 8 including a system of articulated elements for operatively connecting said means for pivoting said V-shaped member with said synchronizing means.

11. In a device including an internal combustion engine, a throttle for varying the power supplied by said engine, a driving shaft actuated by said engine, and a driven shaft, a transmission of the type described, which comprises in combination, a gear box, a progressive clutch for coupling one end of said gear box with one of said shafts, a positive clutch for coupling the other end of said gear box with the other shaft, synchronizing means including two friction clutch elements adapted to cooperate with each other and carried by two cooperating parts of said positive clutch respectively, one of said friction clutch elements being rigidly fixed to the corresponding part of the positive clutch, the other friction clutch element being slidable both axially and angularly, within certain limits, with respect to the respective part of the positive clutch that carries it, means for frictionally braking the displacements of said slidable friction clutch element with respect to the part of the positive clutch that carries it, a threaded part rigid with said slidable friction clutch element, a threaded member engaging said threaded part, said threaded member being fixed angularly to the part of the positive clutch that carries said slidable friction clutch element but being axially slidable with respect thereto, and means for operatively connecting said threaded member to said throttle so as to tend to equalize the speeds of revolution of said cooperating parts of the positive clutch.

12. A transmission of the type described, which comprises in combination, a driving member, a driven member, a gear box, a progressive clutch for coupling one end of said gear box with one of said members, a positive clutch for coupling the other end of said gear box with the other member, synchronizing means, associated with said positive clutch, for causing the respective speeds of revolution of the cooperating parts of the positive clutch to tend toward a common value, means for controlling the progressive clutch, means for controlling the positive clutch, an element for controlling the gear box, and means for operatively connecting said means for controlling the positive clutch with the control element of the gear box.

13. A transmission of the type described, which comprises in combination, a driving member, a driven member, a gear box, a progressive clutch for coupling one end of said gear box to one of said members, a positive clutch for coupling the other end of said gear box with the other member, synchronizing means, associated with said positive clutch, for causing the speeds of the respective cooperating parts of the positive clutch to tend toward a common value, means for controlling said clutches respectively, and means for operatively connecting said control means arranged in such manner that the positive clutch ceases to act as soon as the progressive clutch is sufficiently disengaged and is brought back into its operative position, in which its cooperating parts are in engagement with one another, before the progressive clutch is let in, said last means comprising a rod connected to the control means of the progressive clutch, a second rod connected to the control means of the positive clutch, a pin and slot connection between these rods, and a spring urging the control means of the positive clutch toward the position thereof for which the cooperating parts of said positive clutch are in positive engagement with one another.

14. A transmission of the type described, which comprises in combination, a driving member, a driven member, a gear box, a progressive clutch for coupling one end of said gear box to one of said members, a positive clutch for coupling the other end of said gear box with the other member, synchronizing means, associated with said positive clutch, for causing the speeds of the respective cooperating parts of the positive clutch to tend toward a common value, means for controlling said clutches respectively, means for operatively connecting said control means arranged in such manner that the positive clutch ceases to act as soon as the progressive clutch is sufficiently disengaged and is brought back into its operative position, in which its cooperating parts are in engagement with one another, before the progressive clutch is let in, and stopping means operatively connected with the control means of the positive clutch for preventing the control means of the progressive clutch from coming into the position that applies the cooperating parts of said progressive clutch in engagement with one another, as long as the cooperating parts of the positive clutch have not been brought into positive engagement with one another.

15. A transmission of the type described, which comprises in combination, a driving member, a driven member, a gear box, a progressive clutch for coupling one end of said gear box to one of said members, a positive clutch for coupling the other end of said gear box with the other member, synchronizing means, associated with said positive clutch, for causing the speeds of the respective cooperating parts of the positive clutch to tend toward a common value, means for controlling said clutches respectively, and means for operatively connecting said control means arranged in such manner that the positive clutch ceases to act as soon as the progressive clutch is sufficiently disengaged and is brought back into its operative position, in which its cooperating parts are in engagement with one another, before the progressive clutch is let in, resilient stopping means operatively connected with the control means of the positive clutch for preventing the control means of the progressive clutch from coming into the position that brings the cooperating parts of said progressive clutch into operative engagement as long as the cooperating parts of the positive clutch have not been brought into positive engagement with one another, and means for adjusting the resilience of said stopping means.

GASTON FLEISCHEL.